United States Patent
Behziz et al.

(10) Patent No.: US 9,590,366 B1
(45) Date of Patent: Mar. 7, 2017

(54) CABLE ASSEMBLY AND COMMUNICATION SYSTEM CONFIGURED TO RECEIVE THE CABLE ASSEMBLY

(71) Applicant: Tyco Electronics Corporation, Berwyn, PA (US)

(72) Inventors: Arash Behziz, Newbury Park, CA (US); Michael David Herring, Apex, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 14/788,942

(22) Filed: Jul. 1, 2015

(51) Int. Cl.
| H01R 13/62 | (2006.01) |
| H01R 13/66 | (2006.01) |
| H01R 24/60 | (2011.01) |
| G02B 6/42 | (2006.01) |
| H01R 107/00 | (2006.01) |

(52) U.S. Cl.
CPC ......... H01R 13/665 (2013.01); G02B 6/4278 (2013.01); H01R 24/60 (2013.01); H01R 2107/00 (2013.01)

(58) Field of Classification Search
CPC .......................... H01R 13/635; H01R 9/0735
USPC .............. 439/159, 152, 160, 329, 357, 439/607.35–607.4
See application file for complete search history.

(56) References Cited

U.S. PATENT DOCUMENTS

| 7,227,745 B2* | 6/2007 | Kowalkowski | G02B 6/4292 361/679.33 |
| 7,229,317 B2* | 6/2007 | Togami | G02B 6/4277 439/607.2 |
| 8,033,741 B2* | 10/2011 | Yoshikawa | G02B 6/4201 385/92 |
| 8,129,630 B2* | 3/2012 | Moore | G02B 6/4201 174/384 |
| 2007/0128934 A1* | 6/2007 | Weber | H05K 9/0058 439/607.01 |
| 2007/0173118 A1* | 7/2007 | Chen | H01R 23/6873 439/607.01 |

* cited by examiner

Primary Examiner — Phuongchi T Nguyen

(57) ABSTRACT

Cable assembly including a mating connector having a plurality of communication terminals. The mating connector is configured to mate with a system connector of a communication system during a loading operation. The cable assembly includes a trailing sub-assembly having an intermediate connector and an external cable that is terminated to the intermediate connector. The cable assembly also includes a flexible cable extension having signal pathways that are terminated to and extend from the intermediate connector to the mating connector. The intermediate connector communicatively interconnects the signal pathways and the external cable. The mating connector is configured to engage a guide track when inserted into the communication system and slide along the guide track toward the system connector along a non-linear path. The flexible cable extension permits the signal pathways to bend while transferring an operative force for mating the system connector and the mating connector.

20 Claims, 5 Drawing Sheets

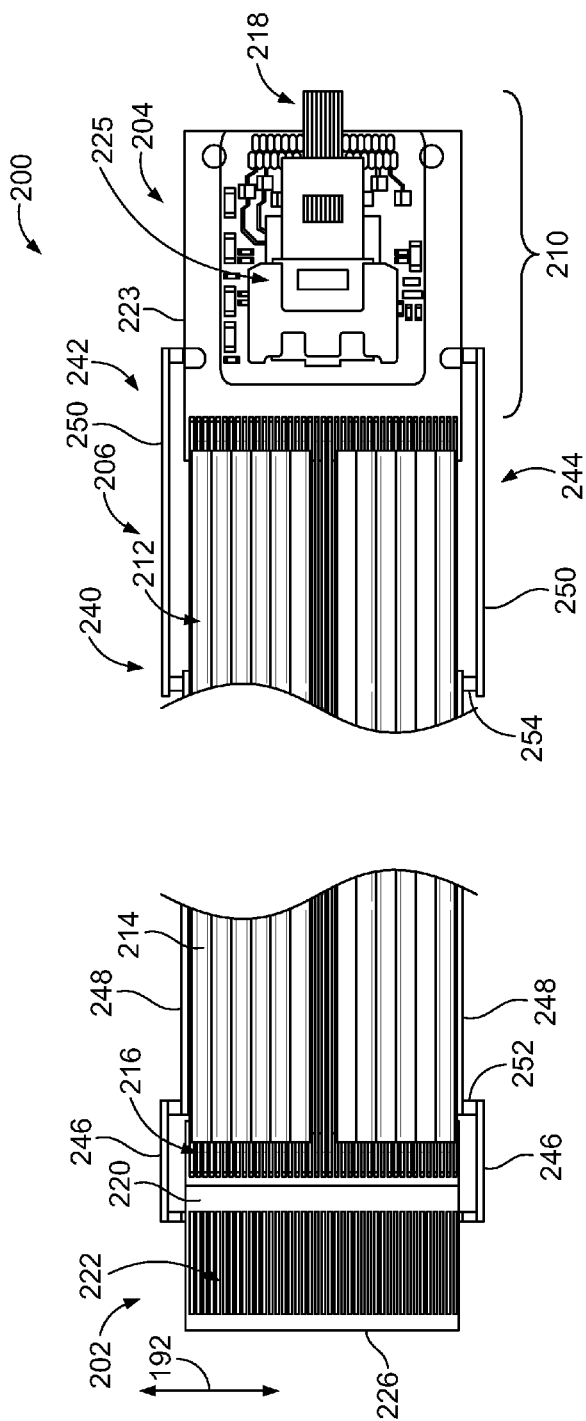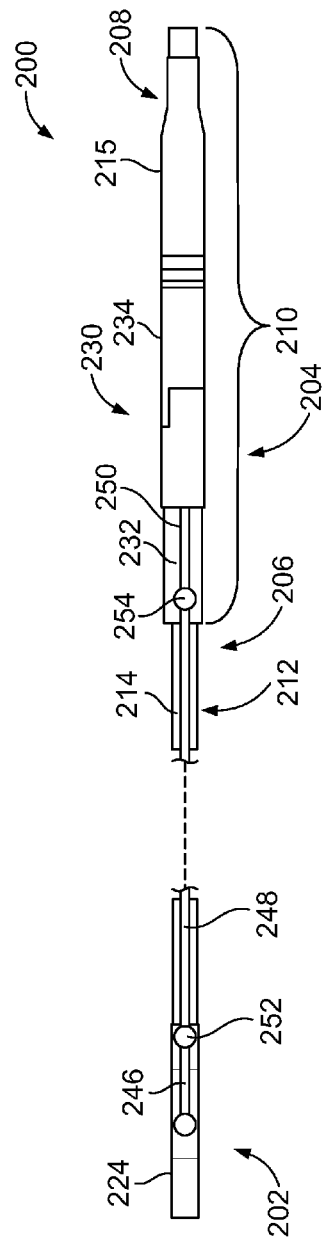
FIG. 2
FIG. 3

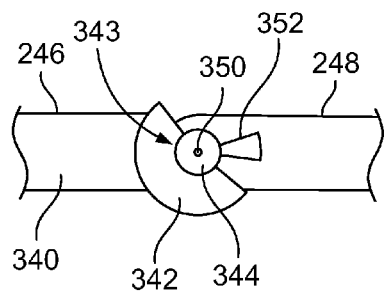
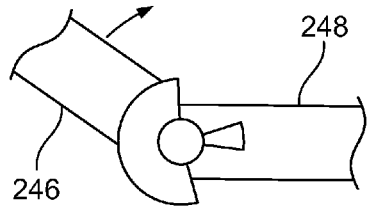
FIG. 9   FIG. 10
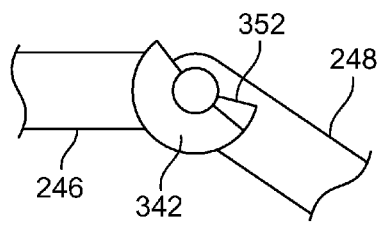
FIG. 11
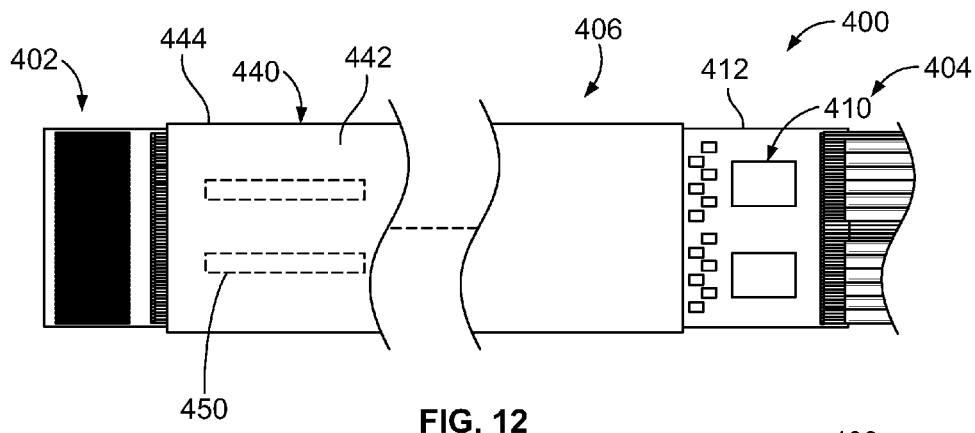
FIG. 12
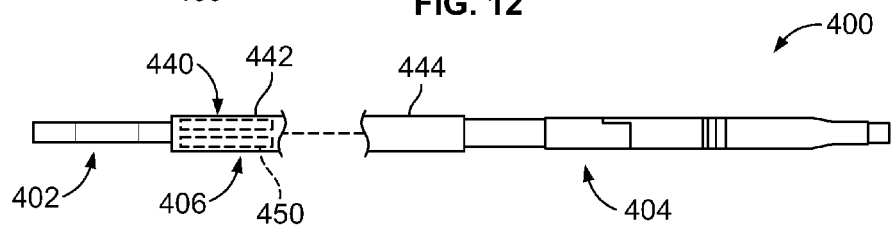
FIG. 13

CABLE ASSEMBLY AND COMMUNICATION SYSTEM CONFIGURED TO RECEIVE THE CABLE ASSEMBLY

BACKGROUND

The subject matter herein relates generally to cable assemblies configured to communicate data signals and communication systems that include the same.

Communication systems, such as routers, servers, uninterruptible power supplies (UPSs), supercomputers, and other computing systems, may be complex systems that have a number of components interconnected to one another. For example, the systems may include a number of interconnected circuit boards in which each circuit board has at least one processor with one or more receptacle connectors connected to the processor through the circuit board. Each receptacle connector is configured to mate with a corresponding mating connector, such as a pluggable input/output (I/O) connector. In some systems, the receptacle connectors are positioned to receive the mating connector through a panel (or bezel) of the system. For instance, a front end of the receptacle connector may be aligned with a window through the panel. The mating connector is inserted through the window and into the receptacle connector. When the mating and receptacle connectors are engaged, the processor and mating connector are connected to each other through the circuit board and receptacle connector.

As performance demands and data rates increase in communication systems, it has become more challenging to achieve a baseline level of signal quality. For example, it is known that dielectric material of a circuit board may cause signal degradation as the data signals propagate along conductive pathways through the dielectric material. As data rates increase, however, the signal degradation becomes even worse. Thus, it may be desirable to reduce the distance that data signals travel through dielectric material, such as the distance between the receptacle connector and the processor.

Positioning the receptacle connector closer to the processor, such as within a few centimeters, would reduce the amount of dielectric material that the data signals travel through. Moving the receptacle connector closer to the processor, however, consequently moves the receptacle connector away from the panel. At least some conventional cable assemblies are not capable of mating with receptacle connectors that are positioned away from the panel.

Another challenge that is rendered more difficult by increasing data rates is controlling the amount of heat that exists within the communication system. For example, the circuit boards typically divide the inner space of the communication system into separate zones. Components, such as the processor, may generate a substantial amount of heat. In some system configurations, the heat-generating components are mounted along the same side of the circuit board. Accordingly, one zone may be significantly warmer than other zones. Moving the receptacle connector closer to the processor may increase the amount of heat experienced by the processor and the receptacle connector, which may negatively affect the performance of the system.

Accordingly, a need exists for a communication system and corresponding cable assembly that position heat-generating components away from each other and/or allow improved airflow through the inner space of the communication system.

BRIEF DESCRIPTION

In an embodiment, a cable assembly is provided that includes a mating connector having a plurality of communication terminals. The mating connector is configured to mate with a system connector of a communication system during a loading operation. The cable assembly also includes a trailing sub-assembly having an intermediate connector and an external cable that is terminated to the intermediate connector. The cable assembly also includes a flexible cable extension having signal pathways that are terminated to and extend from the intermediate connector to the mating connector. The intermediate connector communicatively interconnects the signal pathways and the external cable. The mating connector is configured to engage a guide track when inserted into the communication system during the loading operation and slide along the guide track toward the system connector along a non-linear path. The flexible cable extension permits the signal pathways to bend as the mating connector slides along the non-linear path while transferring an operative force for mating the system connector and the mating connector.

In an embodiment, a communication system is provided that includes a system panel having an outer side that faces an outer space and an inner side that faces an inner space. The system panel includes a communication port having a receiving passage extending through the system panel. The communication port is configured to receive a mating connector of a cable assembly from the outer space. The communication system also includes a circuit board that is positioned within the inner space and has a system connector mounted thereto that is configured to mate with the mating connector. The system connector is spaced apart from the inner side of the system panel. The circuit board coincides with a board plane that extends perpendicular to the system panel. The communication system also includes a guide track extending between the receiving passage and the system connector. The guide track is configured to engage the mating connector of the cable assembly when the mating connector is inserted through the receiving passage during a loading operation. The guide track has a non-linear path that directs the mating connector from the receiving passage and to the system connector during the loading operation.

BRIEF DESCRIPTION OF THE DRAWINGS

FIG. 2 is a plan view of a portion of a cable assembly formed in accordance with an embodiment that may be used with the communication system of FIG. 1.

FIG. 3 is a side view of the cable assembly that may be used with the communication system of FIG. 1.

FIG. 9 is an enlarged view of a joint of a biasing frame that may be used by the cable assembly of FIG. 2.

FIG. 10 is the enlarged view of the joint in a rotated position that may occur during the loading operation.

FIG. 11 is the enlarged view of the joint in another rotated position that may occur during the loading operation.

FIG. 12 is a plan view of a cable assembly formed in accordance with another embodiment that may be used with the communication system of FIG. 1.

FIG. 13 is a side view of the cable assembly that may be used with the communication system of FIG. 1.

DETAILED DESCRIPTION

Figure 1:
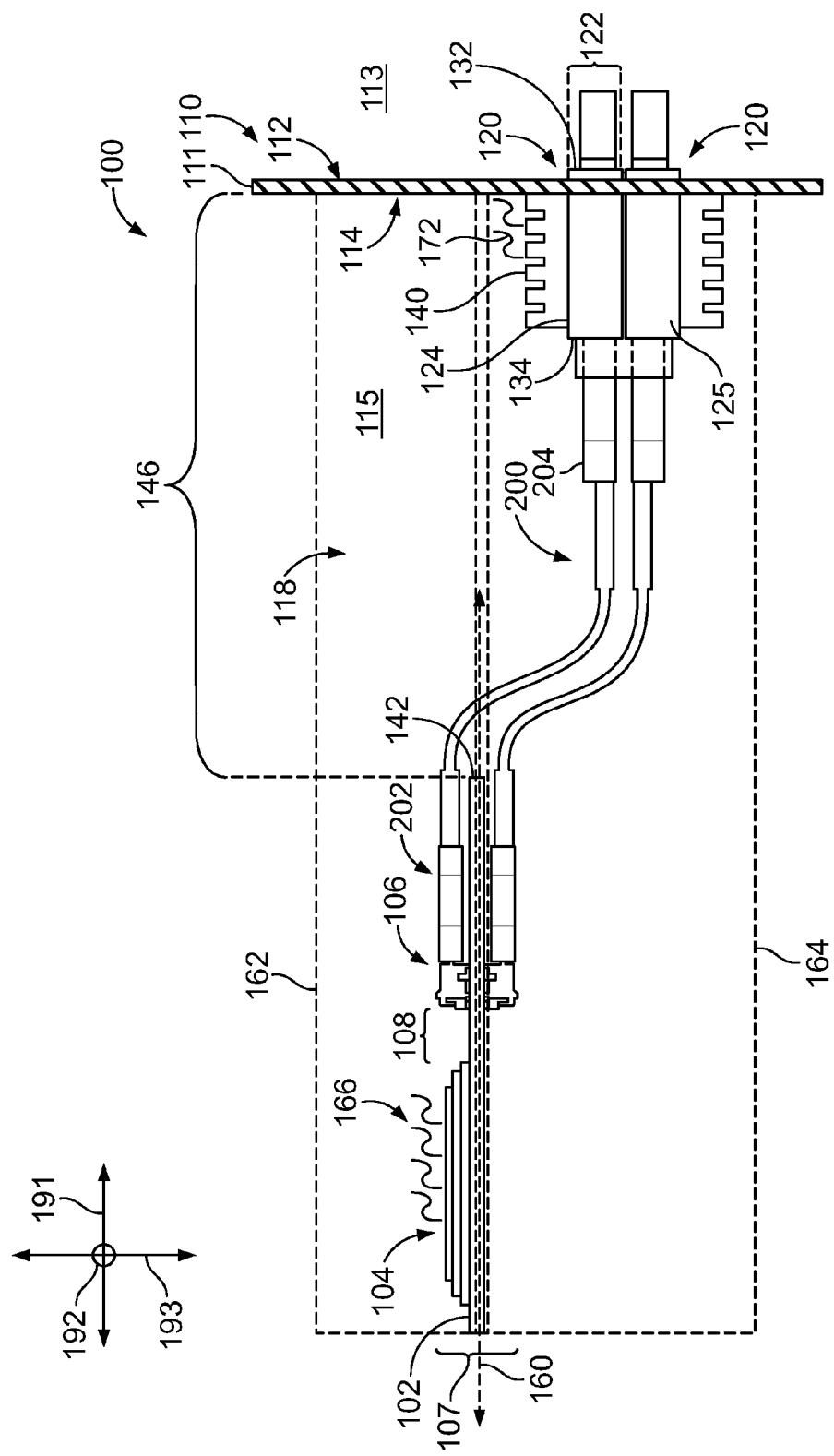
FIG. 1 is a side view of a communication system formed in accordance with an embodiment.

Embodiments set forth herein include communication systems and cable assemblies of the communication systems. The cable assemblies include a mating connector and an intermediate connector that are joined by a flexible cable extension. The mating connector is configured to be inserted into the communication system and moved along a guide track of the communication system. The guide track directs the mating connector from a communication port at a panel (or bezel) of the communication system to a system connector located within an inner space of the communication system. The guide track has a non-linear path such that the flexible cable extension bends as the mating connector moves along the non-linear path. The guide track may allow the system connector to be positioned away from the panel at a variety of locations within the inner space. As such, the system connector and/or other components of the communication system may have different positions within the inner space that may facilitate management of thermal energy within the communication system. For example, embodiments may enable improved airflow within the communication system.

In some embodiments, the intermediate connector includes one or more signal-processing devices that process the data signals of the cable assembly. The signal-processing devices may generate thermal energy. Unlike conventional cable assemblies in which the signal-processing device is incorporated into the mating connector, embodiments set forth herein may position the signal-processing device away from the mating connector and other components of the communication system. In such embodiments, the thermal energy generated by the signal-processing device may be dissipated into the surrounding space away from other heat-generating components of the communication system.

In some embodiments, the mating connector is a pluggable input/output (I/O) module in which at least a portion of the pluggable I/O module is received by the system connector of the communication system. The mating connectors and system connectors described herein may be configured to be compliant with certain industry standards, such as, but not limited to, the small-form factor pluggable (SFP) standard, enhanced SFP (SFP+) standard, quad SFP (QSFP) standard, C form-factor pluggable (CFP) standard, and 10 Gigabit SFP standard, which is often referred to as the XFP standard. In some embodiments, the mating connector may be configured to be compliant with small form factor (SFF), such as SFF-8644 and SFF-8449 HD.

In some embodiments, the cable assemblies described herein may be high-speed cable assemblies that are capable of transmitting data at a rate of at least about four (4) gigabits per second (Gbps), at least about 10 Gbps, at least about 20 Gbps, at least about 40 Gbps, or more. Although the cable assemblies may be high-speed cable assemblies in some embodiments, the cable assemblies may transmit at slower transmission speeds or data rates in other embodiments.

FIG. 1 is a side view of a communication system 100 formed in accordance with an embodiment. For reference, the communication system 100 is oriented with respect to mutually perpendicular axes 191, 192, 193, including a loading axis 191, a lateral axis 192, and a system axis 193. The lateral axis 192 extends into and out of the page in FIG. 1. The communication system 100 may be, for example, a router, server, uninterruptible power supply (UPS), supercomputer, or like system having a number of interconnected components that communicate with each other electrically and, in some embodiments, optically. For example, the communication system 100 includes a circuit board 102 and a plurality of communication devices 104, 106 mounted to the circuit board 102. In some embodiments, the circuit board 102 and the communication devices 104, 106 constitute a daughter card assembly 107 that is mounted to another circuit board (not shown), such as a backplane. In FIG. 1, only one daughter card assembly 107 is shown. However, it is contemplated that the communication system 100 may include a plurality of daughter card assemblies 107. Each daughter card assembly 107 may be coupled to a common component, such as the backplane.

The communication devices 104, 106 may include, among other devices, an integrated circuit (or processor) 104 and a system connector 106. The integrated circuit 104 and the system connector 106 are interconnected to one another through traces (not shown) that extend through dielectric material of the circuit board 102. In other embodiments, the integrated circuit 104 and the system connector 106 may be interconnected to one another through cables. In some embodiments, the integrated circuit 104 and the system connector 106 may be positioned adjacent to each other along the circuit board 102 to reduce a distance that data signals travel between the integrated circuit 104 and the system connector 106. More specifically, a separation distance 108 exists between the integrated circuit 104 and the system connector 106. In some embodiments, the separation distance 108 may be at most 5 centimeters (cm). In some embodiments, the separation distance 108 may be at most 4 cm or, more particularly, at most 3 cm. In more particular embodiments, the separation distance 108 is at most 2 cm or at most 1 cm.

In the illustrated embodiment, only a single integrated circuit 104 and a single system connector 106 are shown. In other embodiments, however, a plurality of integrated circuits 104 and/or the plurality of system connectors 106 may be mounted to a single circuit board 102. For instance, a series of system connectors 106 may be mounted to the circuit board 102 along the lateral axis 192. The integrated circuit 104 may be communicatively coupled to only one of the system connectors 106 or a plurality of the system connectors 106.

The communication system 100 may also include a panel assembly 110. The panel assembly 110 includes a system panel (or bezel) 111 having an outer side 112 and an opposite inner side 114. The panel assembly 110 (or system panel 111) is configured to separate an inner space 115 of the communication system 100 from an outer space 113 of the communication system 100. In some embodiments, the system panel 111 is part of an outer housing or enclosure that surrounds the components of the communication system 100. The outer space 113 may be a space that is accessible to an individual, such as a technician. The inner space 115, however, may not be readily accessible to the individual without removing the system panel 111.

The panel assembly 110 may include a plurality of communication ports 120. In the illustrated embodiment, the panel assembly 110 includes only two communication ports 120. In other embodiments, however, the panel assembly 110 may include only one communication port 120 or several communication ports 120. In the illustrated embodiment, the two communication ports 120 are stacked adjacent to each other. In other embodiments, however, the communication ports 120 may have different positions relative to each other than those shown in FIG. 1.

In the illustrated embodiment, each communication port 120 includes a receiving passage or window 122 of the system panel 111. Optionally, the communication port 120 may also include a receptacle 124 that is aligned with one of the receiving passages 122. As shown, the receptacle 124 is coupled to the system panel 111. The receptacle 124 may be sized and shaped to receive a portion of a cable assembly 200. More specifically, the receptacle 124 may include a receptacle housing 125 that is configured to guide a mating connector 202 of the cable assembly 200 through the system panel 111 from the outer space 113 and into the inner space 115. The receptacle 124 may guide the mating connector 202 onto a guide track, which is described below with reference to FIGS. 6-8.

Each receptacle 124 may be secured in a fixed position relative to the system panel 111. As shown, the receptacle 124 includes a front end 132 and a back and 134. The front end 132 is disposed in front of the system panel 111 and in the outer space 113, and the back end 134 is disposed within the inner space 115. In other embodiments, the front end 132 may engage the system panel 111 or be disposed within the inner space 115. In particular embodiments, each communication port 120 also includes a thermal-dissipation component 140, such as a heat sink, that is operably coupled to the corresponding receptacle 124. The thermal-dissipation component 140 includes a block of thermally conductive material that absorbs thermal energy generated within the receptacle 124.

In the illustrated embodiment, the circuit board 102 includes a board edge 142. In particular embodiments, the board edge 142 is spaced apart from the inner side 114 of the system panel 111. More specifically, a guide region 119 of the inner space 115 may exist between the board edge 142 and the inner side 114 of the system panel 111. The guide region 119 represents a portion of the inner space 115 that is configured to have a guide assembly 150 (shown in FIG. 6) disposed therein. The guide assembly 150 includes at least one guide track that is configured to guide the mating connector 202 of the cable assembly 200 from a corresponding communication port 120 to a corresponding system connector 106. In the illustrated embodiment, the board edge 142 is separated from the system panel 111 by an axial distance 146 that is measured along the loading axis 191. The axial distance 118 may be for, example, at least 3 cm or, more specifically, at least 5 cm. In particular embodiments, the axial distance 118 may be at least 7 cm or, more particularly, at least 8 cm. In some embodiments, the axial distance 118 is less than 15 cm.

As shown the circuit board 102 extends along a board plane 160 that is parallel to the loading axis 191 and the lateral axis 192. The board plane 160 is perpendicular to the system panel 111 in FIG. 1. In some embodiments, the circuit board 102 divides the inner space 115 into separate zones. For example, the integrated circuit 104 and the system connector 106 may be located within a first zone 162 (indicated by a dashed box) along one side of the board plane 160. On the other side of the board plane 160, a second zone 164 (indicated by a dashed box) may exist. During operation of the communication system 100, thermal energy 166 generated by the integrated circuit 104 or other communication devices mounted to the circuit board 102 is dissipated directly into the first zone 162. The first zone 162 may have a temperature that is greater than a temperature of the second zone 164. For example, the second zone 164 may not have thermal energy generated therein from the integrated circuit 104 or other communication devices mounted to the circuit board 102.

The guide assembly 150 (FIG. 6) and the cable assembly 200 may allow different components of the communication system (e.g., the daughter card assembly 107, the integrated circuit 104, and/or the system connector 106) to be positioned at locations that facilitate improved thermal management, such as improved airflow. Alternatively or in addition to the above, the guide assembly 150 and the cable assembly 200 may enable the positioning of one or more heat-generating components away from other heat-generating components of the communication system 100. For example, the cable assembly 200 may include an intermediate connector 204, such as a signal converter, that generates heat. The intermediate connector 204 may be located at least partially within the receptacle 124 such that the thermal-dissipation component 140 absorbs thermal energy 172 generated by the intermediate connector 204 and dissipates the thermal energy 172 into the second zone 164 near the system panel 111.

As set forth herein, the intermediate connector 170 may include signal-processing devices that are configured to improve or maintain signal quality and/or convert the data signals between different signal forms. For example, the intermediate connector 170 may include a signal converter that transforms the data signals from an electrical form to an optical form or vice versa. By positioning at least two of the heat-generating components further away from each other, the temperature of the inner space 115 may be reduced and/or controlled in a more efficient manner. Consequently, the performance and/or lifetime operability of the heat-generating components or other components of the communication system 100 may be improved.

Although some embodiments may include intermediate connectors 170 that are heat-generating components, other embodiments may not include intermediate connectors that generate a substantial amount of heat. Nonetheless, the communication system 100 may allow better management of thermal energy within the inner space 115 compared to conventional systems by improving airflow within the inner space 115. For example, air may be permitted to flow through the guide region 119 between the first and second zones 162, 164.

FIG. 2 is a plan view of a portion of the cable assembly 200, and FIG. 3 is a side view of a portion of the cable assembly 200. The cable assembly 200 includes the mating connector 202, the intermediate connector 204, and a flexible cable extension 206 that extends between and communicatively couples the mating connector 202 and the intermediate connector 204. The flexible cable extension 206 is configured to bend as the mating connector 202 is moved along a non-linear path within the inner space 115 (FIG. 1) of the communication system 100 (FIG. 1). The flexible cable extension 206 may have a length that is measured between the mating connector 202 and the intermediate connector 204. The length is based on the axial distance 118 (FIG. 1). The length may be for, example, at least 6 cm or, more specifically, at least 8 cm. In particular embodiments, the length may be at least 10 cm or, more particularly, at least 12 cm.

The flexible cable extension 206 includes a plurality of signal pathways 212. The signal pathways 212 may include, for example, electrical wire conductors or optical fibers. In the illustrated embodiment, the signal pathways 212 are electrical cables 214 having wire conductors 216 (FIG. 2). The wire conductors 216 are terminated (e.g., soldered or welded) to the mating connector 202 at one end and terminated to the intermediate connector 204 at the other end. Each electrical cable 214 may include one or more wire conductors 216. In the illustrated embodiment, each electrical cable 214 includes a pair of wire conductors 216. For example, the electrical cables 214 are twinaxial (twinax) cables that include a parallel pair of the wire conductors 216 and an optional drain wire. It should be understood, however, that other types of electrical cables may be used. In alternative embodiments, optical fibers may be used.

The cable assembly 200 also includes an external cable 208 (shown in FIG. 3). In illustrated embodiment, the external cable 208 and the intermediate connector 204 form a trailing sub-assembly 210 of the cable assembly 200. The cable extension 206 extends from the trailing sub-assembly 210. The external cable 208 is referenced as "external" because the external cable 208 is positioned within the outer space 113 (FIG. 1) during operation of the communication system 100. However, the external cable 208 may be located within a larger portion of the communication system 100, such as within a cabinet (not shown). The external cable 208 may include an outer jacket 215 (FIG. 3) that surrounds a plurality of signal pathways 218 (FIG. 2). The signal pathways 218 may be electrical wire conductors and/or optical fibers. In the illustrated embodiment, the signal pathways 218 are optical fibers. The intermediate connector 204 is configured to interconnect the signal pathways 218 of the external cable 208 and the signal pathways 212 of the flexible cable extension 206.

The intermediate connector 204 includes a circuit board (or board substrate) 223 and a signal-processing device 225 (FIG. 2) that is mounted to the circuit board 223 and configured to process signals that are transmitted through the intermediate connector 204. The intermediate connector 204 may be bidirectional such that data signals may be transmitted from the signal pathways 212 to the signal pathways 218 or vice versa. The signal-processing device 225 may be, for example, a signal converter that is configured to convert the data signals from one signal form to another signal form. More specifically, the signal-processing device 225 may convert electrical data signals into optical data signals and vice versa.

In alternative embodiments, the signal-processing device 225 may have other functionalities. For example, the signal-processing device 225 may be an active device that processes only electrical data signals. In such embodiments, the signal-processing device 225 may include one or more capacitors, inductors, or resistors. The capacitor(s), inductor(s), and/or resistor(s) may be use to (a) control a flow of direct current along a signal pathway; (b) filter the signals along the signal pathway; and/or (c) reduce data transmission losses.

As shown in FIG. 3, the intermediate connector 204 includes a connector housing 230. The connector housing 230 includes a shroud 232 and an overmold body 234. The shroud 232 is configured to surround the terminating ends of the wire conductors 216 of the electrical cables 214 at the intermediate connector 204. The overmold body 234 may surround and protect other circuitry of the intermediate connector 204. For example, the overmold body 234 may encase the signal-processing device 225. The overmold body 234 may also surround at least a portion of the shroud 232.

During operation of the communication system 100, the intermediate connector 204 is positioned within the receptacle 124 (FIG. 1). As such, the connector housing 230 is sized and shaped to fit within the receptacle 124. In some embodiments, the connector housing 230 may include features for securing the connector housing 230 to the panel assembly 110 (FIG. 1). For instance, the connector housing 230 may include openings or cavities that receive corresponding latches (not shown) of the receptacle 124 to secure the intermediate connector 204 to the panel assembly 110. To remove the cable assembly 200, the latches may be engaged by the operator to allow the connector housing 230 to be withdrawn from the receptacle 124.

The mating connector 202 is configured to mate with the system connector 106 (FIG. 1). With respect to FIG. 2, the mating connector 202 includes a board substrate 220 and an array of communication terminals 222 supported by the board substrate 220. In the illustrated embodiment, the communication terminals 222 are electrical contacts (or contact pads) that are exposed along the board substrate 220. As such, the communication terminals are hereinafter referred to as electrical contacts 222. In other embodiments, however, the communication terminals are not electrical contacts. Instead, the communication terminals may be optical fiber ends (or optical terminals).

The mating connector 202 may also include a connector housing 224 (shown in FIG. 3) that surrounds the board substrate 220 and the terminating ends of the wire conductors 216. The board substrate 220 may include a leading edge 226 that is configured to extend along the lateral axis 192 (FIG. 1). The electrical contacts 222 are positioned along the lateral axis 192 proximate to the leading edge 226. In particular embodiments, the electrical contacts 222 are configured for differential signaling.

As shown in FIGS. 2 and 3, the cable assembly 200 may also include a biasing frame 240. The biasing frame 240 is configured to transfer an operative force applied by the operator for engaging the mating connector 202 and the system connector 106 (FIG. 1). The biasing frame 240 is also configured to permit the flexible cable extension 206 to bend in a predetermined manner as the mating connector 202 slides along the guide assembly 150.

In the illustrated embodiment, the biasing frame 240 includes a plurality of linkages that are movably coupled to one another. The biasing frame 240 includes a first frame assembly 242 and a second frame assembly 244. The first and second frame assemblies 242, 244 are located on opposite sides of the flexible cable extension 206 and extend from the intermediate connector 204 to the mating connector 202. Each of the first and second frame assemblies 242, 244 is coupled to the intermediate connector 204 and the mating connector 202.

In the illustrated embodiment, each of the first and second frame assemblies 242, 244 includes a leading end linkage 246, a interconnecting linkage 248, and a trailing end linkage 250 that are coupled to one another. The leading end linkage 246, the interconnecting linkage 248, and the trailing end linkage 250 may be, for example, rigid beams. As shown, the leading end linkage 246, the interconnecting linkage 248, and the trailing end linkage 250 are linear beams, but it should be understood that the beams may have non-linear shapes in alternative embodiments. The leading end linkage 246 is secured to the mating connector 202, and the interconnecting linkage 248 extends between and joins the leading end linkage 246 and the trailing end linkage 250. The trailing end linkage 250 is secured to the intermediate connector 204. The first and interconnecting linkages 246, 248 are rotatably coupled to each other at a joint 252. The second and trailing end linkages 248, 250 are rotatably coupled to each other at a joint 254. The joints 252, 254 permit the linkages to move with respect to one another during the loading operation.

FIGS. 2 and 3 illustrate a particular configuration of the biasing frame 240. It should be understood, however, that the biasing frame may have other configurations in other embodiments. For example, the biasing frame may include only a single frame assembly in other embodiments.

Figure 4:
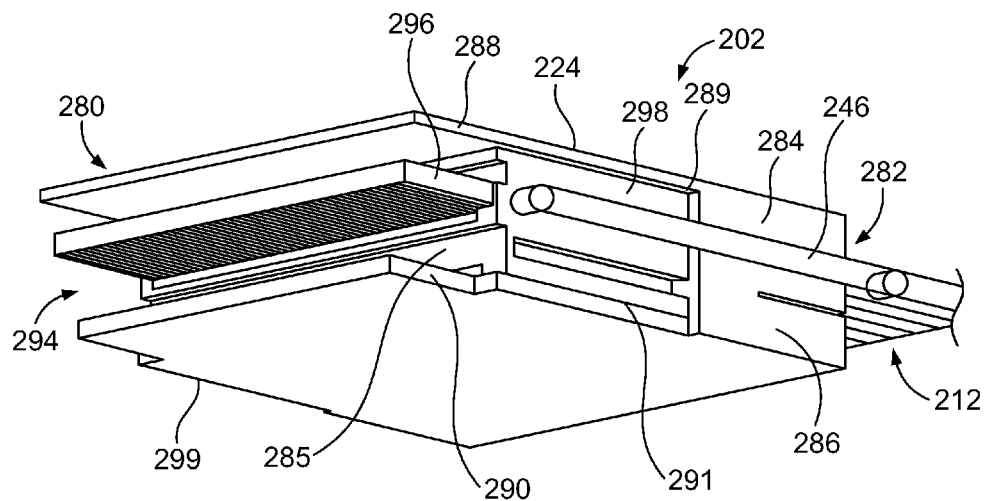
FIG. 4 is a perspective view of a mating connector of the cable assembly of FIG. 2.

FIG. 4 is a bottom perspective view of the mating connector 202. The connector housing 224 of the mating connector 202 includes a mating end 280 and a back end 282 that face in opposite directions. The back end 282 is coupled to the signal pathways 212. The connector housing 224 may include first and second housing shells 284, 286. The first and second housing shells 284, 286 may couple to each other with the board substrate 220 positioned therebetween. The first and second housing shells 284, 286 form a forward-facing wall 285 from which the board substrate 220 extends.

Also shown, the first housing shell 284 includes a housing wall 288, and the second housing shell 286 includes a housing wall 290. The housing walls 288, 290 of the first and second housing shells 284, 286, respectively, project from the forward-facing wall 285 and form a connector-receiving space 294 therebetween. The portion of the board substrate 220 projecting into the connector-receiving space 294 is hereinafter referred to as the mating portion 296. The mating portion 296 includes the leading edge 226 and is configured to be received by the system connector 106 (FIG. 1) during the loading operation.

As shown in FIG. 4, the connector housing 224 has opposite sidewalls 298, 299 that extend longitudinally between the forward-facing wall 285 and the back end 282 and vertically between the housing wall 288 and the housing wall 290. One or more of the sidewalls 298, 299 and/or the housing walls 288, 290 may be configured to engage and slide along the guide assembly 150. More specifically, the connector housing 224 may be shaped relative to the guide assembly 150 so that the mating connector 202 is directed by the guide assembly 150 during the loading operation. In the illustrated embodiment, the housing walls 288, 290 extend beyond the sidewall 298 and form respective flanges or ledges 289, 291. The flanges 289, 291 may engage and slide along rails 320 (shown in FIG. 6) of the guide assembly 150. Also shown in FIG. 4, the leading end linkage 246 of the second frame assembly 244 is coupled to the connector housing 224 along the sidewall 298. The leading end linkage 246 may have a fixed position relative to the mating connector 202.

Figure 5:
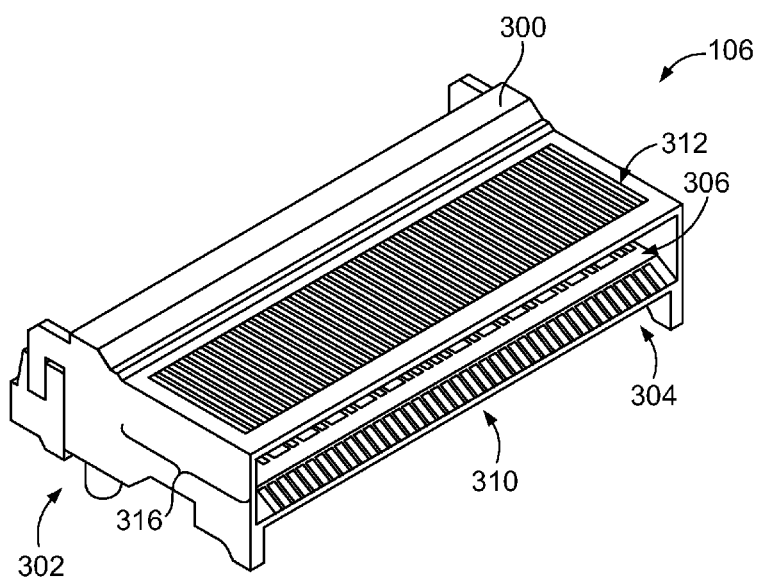
FIG. 5 is a perspective view of a system connector of the communication system of FIG. 1 that may mate with the mating connector.

FIG. 5 is a perspective view of the system connector 106. The system connector 106 includes a connector body 300 having a mounting side 302 that is configured to be mounted to the circuit board 102 (FIG. 1) and a mating side 304 that is configured to mate with the mating connector 202 (FIG. 1). The mating side 304 includes a receiving cavity 306 that is sized and shaped to receive the mating portion 296 (FIG. 4) of the board substrate 220 (FIG. 2). Although not shown, the system connector 106 includes an array of electrical contacts that extends through the connector body 300. The electrical contacts may be exposed along the mounting side 302 so that the electrical contacts may be terminated to the circuit board 102. The electrical contacts may also be exposed within the receiving cavity 306 for engaging the board substrate 220. For example, the electrical contacts may include beams that extend into the receiving cavity 306 and are deflected by the board substrate 220 during the loading operation. When the system connector 106 and the mating connector 202 are fully mated, the electrical contacts of the system connector 106 engage corresponding electrical contacts 222 (FIG. 2) of the mating connector 202.

In the illustrated embodiment, the connector body 300 is configured to form a lateral slot 310 between a portion of the mounting side 302 and the circuit board 102. The lateral slot 310 is sized and shaped to receive a portion of the housing wall 290. The connector body 300 also includes a top side 312, which represents the side of the connector body 300 that is furthest from the circuit board 102. The housing wall 288 is configured to slide along the top side 312. As such, an insert portion 316 of the connector body 300 is positioned within the connector-receiving space 294 when the mating connector 202 and the system connector 106 are fully mated.

Figure 6:
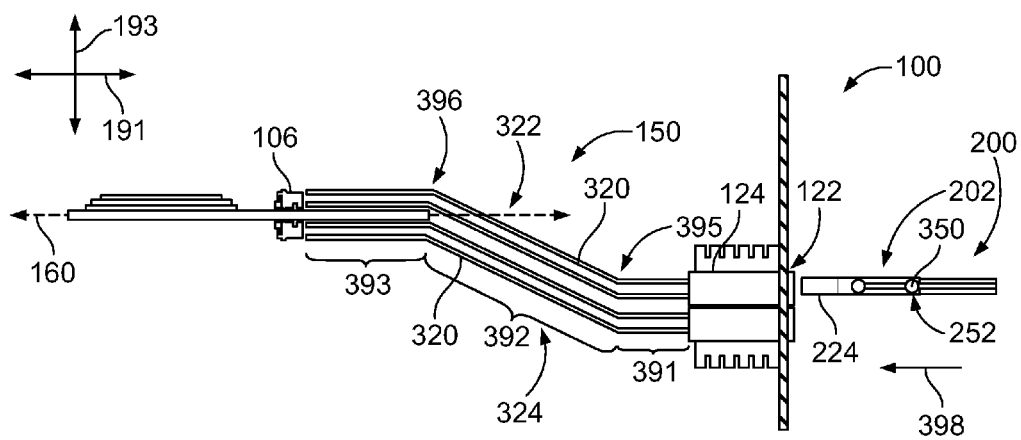
FIG. 6 is a side view of the communication system when the mating connector is poised for being loaded into the communication system.
Figure 7:
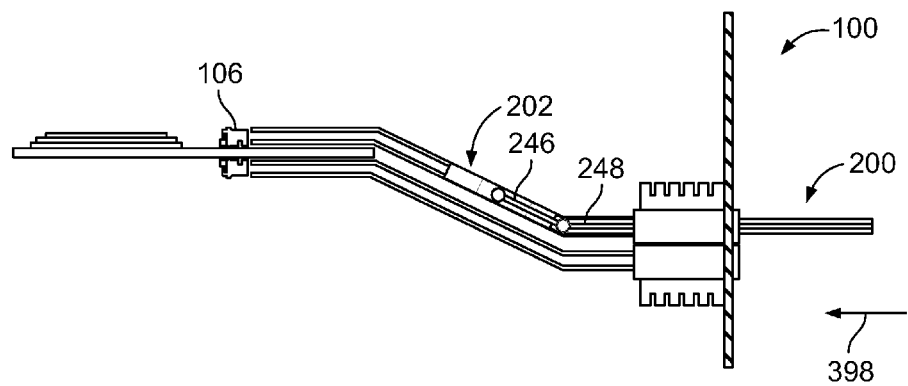
FIG. 7 is the side view of the communication system as the mating connector is re-directed during the loading operation.
Figure 8:
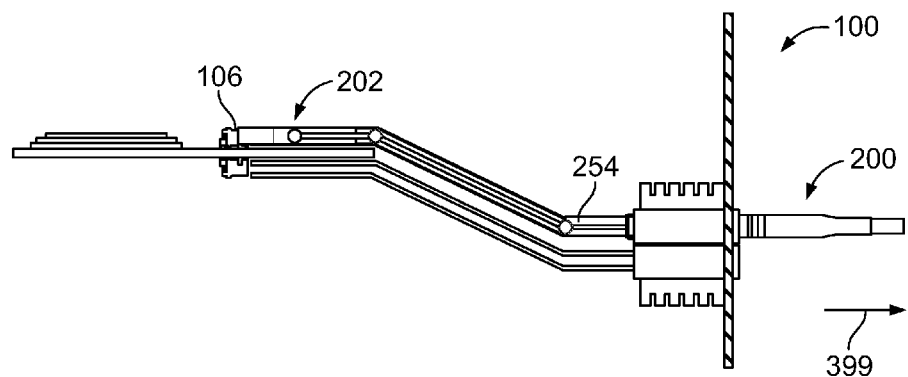
FIG. 8 is the side view of the communication system when the mating connector is fully mated with the system connector.

FIGS. 6, 7, and 8 illustrate side views of the communication system 100 during first, second, and third stages, respectively, of the loading operation. As shown in FIG. 6, the guide assembly 150 includes a plurality of rails 320. The rails 320 are positioned relative to each other and shaped to engage and guide the mating connector 202 along a predetermined path between the corresponding receiving passage 122 and the system connector 106. As shown in FIG. 6, the rails 320 form a first guide track 322 and a second guide track 324. Each of the first and second guide tracks 322, 324 forms a non-linear path between a corresponding receiving passage 122 (or corresponding receptacle 124) and a corresponding system connector 106. Each of the first and second guide tracks 322, 324 is configured to guide a corresponding mating connector 202 of a cable assembly 200. Only one cable assembly 200 is shown in FIGS. 6-8. In the illustrated embodiment, the non-linear paths of the first and second guide tracks 322, 324 are identical. In other embodiments, however, the first and second guide tracks 322, 324 may have different paths.

Unlike conventional communication systems, the receiving passage 122 (or the receptacle 124) and the system connector 106 are not aligned with each other such that the mating connector 202 moves in only one direction parallel to the loading axis 191 to mate with the system connector 106. Instead, the guide tracks 322, 324 are configured to change a position (or elevation) of the corresponding mating connector 202 relative to the system axis 193 as the mating connector 202 moves towards the system connector 106. To this end, the rails 320 are sized and shaped to direct the mating connector 202 along the non-linear path. In an exemplary embodiment, the rails 320 may engage the flanges 289, 291 (FIG. 4) of the connector housing 224.

Each of the first and second guide tracks 322, 324 includes a receiving segment 391, a re-directing segment 392, and an end segment 393. The re-directing segment 392 extends between the receiving segment 391 and the end segment 393. The receiving segment 391 joins the re-directing segment 392 at a first turn 395. The re-directing segment 392 joins the end segment 393 at a second turn 396. Each of the receiving segment 391 and the end segment 393 is configured to hold or orient the mating connector 202 such that the mating connector 202 extends parallel to the loading axis 191. The re-directing segment 392, however, extends in a different direction relative to the end segment 393 and the receiving segment 391. The re-directing segment 392 extends non-parallel with respect to the loading axis 191 or the board plane 160. In the illustrated embodiment, the re-directing segment 392 is linear from the receiving segment 391 to the end segment 393. In other embodiments, however, the re-directing segment 392 may have a curved contour and/or two or more linear segments that are non-parallel with respect to each other.

FIGS. 9-11 illustrate side views of the joint 252 during the loading operation. FIG. 9 illustrates the positional relationship between the leading end linkage 246 and the interconnecting linkage 248 prior to the mating connector 202 (FIG. 1) being inserted into the receptacle 124 (FIG. 1). As shown, the leading end linkage 246 and the interconnecting linkage 248 have a linear relationship in which each of the leading end linkage 246 and the interconnecting linkage 248 extend parallel to the loading axis 191 (FIG. 1). The leading end linkage 246 includes an elongated beam 340 and a rotatable body 342 that is coupled to an end of the beam 340.

The interconnecting linkage 248 includes a central pin 344 that couples to the rotatable body 342. For example, the rotatable body 342 may be C-shaped and form a recess 343 that receives the central pin 344. The rotatable body 342 and the central pin 344 may form an interference or snap-fit engagement. As shown in FIG. 9, the leading end linkage 246 and the interconnecting linkage 248 are rotatable about a pivot axis 350. Also shown in FIG. 9, the interconnecting linkage 248 may include a positive stop 352 in some embodiments. The positive stop 352 may be coupled to or formed with the central pin 344. The positive stop 352 is configured to limit the rotation of the leading end linkage 246 and the interconnecting linkage 248 with respect to each other. For example, the leading end linkage 246 may rotate, at most 180° about the pivot axis 350.

FIG. 10 illustrates the positional relationship between the leading end linkage 246 and the interconnecting linkage 248 as the mating connector 202 (FIG. 1) is rotated by the guide track 322 (FIG. 6) at the first turn 395 (FIG. 6). As shown, the leading end linkage 246 is rotated clockwise with respect to the pivot axis 350. In FIG. 10, the leading end linkage 246 has rotated about 45° with respect to the positional relationship shown in FIG. 9. After rotating to the position shown in FIG. 10, the leading end linkage 246 may rotate in a counterclockwise direction along the pivot axis 350 as the mating connector 202 ascends the guide track 322.

FIG. 11 illustrates the positional relationship between the leading end linkage 246 and the interconnecting linkage 248 when the mating connector 202 (FIG. 1) is fully engaged with the end segment 393 (FIG. 6) of the guide track 322 and oriented parallel to the loading axis 191. As shown in FIG. 11, the positive stop 352 is engaged with the rotatable body 342 such that the positive stop 352 prevents the leading end linkage 246 from rotating further in a counterclockwise direction relative to the interconnecting linkage 248. In some embodiments, by preventing further rotation of the leading end linkage 246, the biasing frame 240 may overcome forces (e.g., frictional forces) the resist movement of the mating connector 202 toward the system connector 106.

Returning to FIG. 6, the mating connector 202 is aligned with the receptacle 124. During the loading operation, an operative force 398 is applied by an operator in a loading direction along the loading axis 191. The operator may be, for example, a machine or individual. As the mating connector 202 is inserted through the receptacle 124 the connector housing 224 may engage the rails 320 and slide therealong. As the mating connector 202 moves along the loading axis 191, the mating connector 202 may engage the re-directing segment 392 at the first turn 395. The rails 320 at the first turn 395 and the operative force 398 cause the mating connector 202 to rotate about the pivot axis 350 of the first joint 252.

As shown in FIG. 7, the mating connector 202 may slide along the re-directing segment 392 toward the system connector 106. When the mating connector 202 engages the end segment 393 at the second turn 396, the mating connector 202 may rotate about the pivot axis 350 at the first joint 252 in a counterclockwise direction until the leading end linkage 246 and the interconnecting linkage 248 have the positional relationship shown in FIG. 11. With the operative force 398 still applied, the mating connector 202 may slide toward and engage the system connector 106. More specifically, the mating portion 296 (FIG. 4) of the board substrate 220 may be inserted into the receiving cavity 306 (FIG. 5) of the system connector 106. Accordingly, the biasing frame 240 operates to transfer the operative force 398 for mating the system connector 106 and the mating connector 202.

During the loading operation, the second joint 254 may operate in a similar manner as the first joint 252 such that the interconnecting linkage 248 and the trailing end linkage 250 may move with respect to each other to allow the mating connector 202 to be guided toward the system connector 106. As shown in FIG. 8, the mating connector 202 and the system connector 106 are fully mated. To remove the cable assembly 200, a withdrawing force 399 may be applied by the operator in a direction that is opposite the loading direction along the loading axis 191.

FIGS. 12 and 13 illustrate a plan view and a side view of a portion of a cable assembly 400. The cable assembly 400 may be similar to the cable assembly 200 (FIG. 1) and be inserted into the communication system 100 (FIG. 1) during a loading operation. For example, the cable assembly 400 includes a mating connector 402, an intermediate connector 404, and a flexible cable extension 406 that extends between and joins the mating connector 402 and the intermediate connector 404. In the illustrated embodiment, the intermediate connector 404 includes a circuit board 412 having signal-processing devices 410 mounted thereto. The signal-processing devices 410 may include, for example, one or more processors. In other embodiments, the signal-processing devices 410 includes one or more capacitors, inductors, or resistors. In FIG. 12, the signal-processing devices 410 do not include signal converters that change the form of the data signals. In other embodiments, however, the signal-processing devices 410 may include signal converters.

The cable assembly 400 also includes a biasing frame 440. The biasing frame 440, however, does not include a plurality of linkages. Instead, the biasing frame 440 includes an elastic material 442 that extends along signal pathways (not shown) of the flexible cable extension 406. In the illustrated embodiment, the elastic material 442 forms a jacket 444 that surrounds the signal pathways. The jacket 444 may be shaped to form a flat ribbon. The signal pathways may be similar or identical to the signal pathways 212 (FIG. 2).

During the loading operation, the elastic material 442 permits the signal pathways to bend as the mating connector 402 slides along the non-linear path of the guide track. In some embodiments, the elastic material 442 (or jacket 444) is biased to resist this bending. In such embodiments, the elastic material 442 (or jacket 444) may transfer an operative force applied by the operator for mating the system connector (not shown) and the mating connector 402.

In some embodiments, the jacket 444 includes one or more resilient elements 450 that are coupled to or embedded within the jacket 444. The resilient elements 450 may be, for example, stamped-and-formed strips of metal that have a designated shape. The designated shape may bias the flexible cable extension 406 into a predetermined contour. When the flexible cable extension 406 bends into a different contour, the resilient elements 450 transfer the operative force for mating the system connector and the mating connector 402.

In other embodiments, however, the elastic material 442 may not surround the signal pathways. For example, the elastic material 442 may be a flexible rod that extends between and join the mating connector 402 and the intermediate connector 404. The flexible rod may permit the mating connector 402 to move along the guide track.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled.

As used in the description, the phrase "in an exemplary embodiment" and the like means that the described embodiment is just one example. The phrase is not intended to limit the inventive subject matter to that embodiment. Other embodiments of the inventive subject matter may not include the recited feature or structure. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means—plus-function format and are not intended to be interpreted based on 35 U.S.C. §112(f), unless and until such claim limitations expressly use the phrase "means for" followed by a statement of function void of further structure.

What is claimed is:

1. A cable assembly comprising:
   a mating connector having a plurality of communication terminals, the mating connector configured to mate with a system connector of a communication system during a loading operation;
   a trailing sub-assembly including an intermediate connector and an external cable that is terminated to the intermediate connector; and
   a flexible cable extension including signal pathways that are terminated to and extend from the intermediate connector to the mating connector, the intermediate connector communicatively interconnecting the signal pathways and the external cable;
   wherein the mating connector is configured to engage a guide track when inserted into the communication system during the loading operation and slide along the guide track toward the system connector along a non-linear path, the flexible cable extension permitting the signal pathways to bend as the mating connector slides along the non-linear path while transferring an operative force for mating the system connector and the mating connector.

2. The cable assembly of claim 1, wherein the intermediate connector includes a circuit board and a signal-processing device, the signal-processing device configured to process data signals transmitting between the external cable and the signal pathways.

3. The cable assembly of claim 2, wherein the signal-processing device includes a signal converter configured to convert data signals between an electrical form and an optical form, the external cable being an optical cable.

4. The cable assembly of claim 1, wherein the flexible cable extension further comprises a biasing frame that includes first and interconnecting linkages movably coupled to each other, wherein the biasing frame transfers the operative force for mating the system connector and the mating connector.

5. The cable assembly of claim 4, wherein the first and interconnecting linkages are rotatably coupled to each other at a joint, the joint permitting at most 180° rotation.

6. The cable assembly of claim 1, wherein the flexible cable extension includes an elastic material that permits the signal pathways to bend as the mating connector slides along the non-linear path while transferring the operative force for mating the system connector and the mating connector.

7. The cable assembly of claim 6, wherein the elastic material forms a jacket that surrounds the signal pathways, the elastic material including resilient elements coupled to or embedded within the jacket, the resilient elements being biased to straighten the jacket.

8. The cable assembly of claim 1, wherein the flexible cable extension includes a flat ribbon having the signal pathways.

9. The cable assembly of claim 1, wherein the flexible cable extension includes electrical cables having wire conductors that form the signal pathways.

10. The cable assembly of claim 1, wherein the mating connector includes a board substrate, the communication terminals being electrical contacts exposed along a leading portion of the board substrate.

11. A communication system comprising:
    a system panel having an outer side that faces an outer space and an inner side that faces an inner space, the system panel including a communication port having a receiving passage extending through the system panel, the communication port configured to receive a mating connector of a cable assembly from the outer space;
    a circuit board positioned within the inner space and having a system connector mounted thereto that is configured to mate with the mating connector, the system connector being spaced apart from the inner side of the system panel, the circuit board coinciding with a board plane that extends perpendicular to the system panel; and
    a guide track extending between the receiving passage and the system connector, the guide track being configured to engage the mating connector of the cable assembly when the mating connector is inserted through the receiving passage during a loading operation, the guide track having a non-linear path that directs the mating connector from the receiving passage and to the system connector during the loading operation.

12. The communication system of claim 11, wherein the non-linear path extends parallel to the board plane for at least a portion of the guide track and non-parallel to the board plane for at least a portion of the guide track.

13. The communication system of claim 11, wherein the board plane separates the inner space into first and second zones, the system further comprising an integrated circuit that is mounted to the circuit board and positioned within the first zone, wherein the communication port is aligned with the second zone.

14. The communication system of claim 11, wherein the communication port includes a receptacle that defines a portion of the receiving passage, the receptacle having a thermal-dissipation component mounted thereto that absorbs thermal energy generated within the receptacle and dissipates the thermal energy into the inner space.

15. The communication system of claim 11, wherein the system panel includes a plurality of the communication ports.

16. The communication system of claim 11, further comprising an integrated circuit that is mounted to the circuit board and positioned adjacent to the system connector.

17. The communication system of claim 16, wherein the integrated circuit and the system connector are less than five (5) centimeters apart.

18. The communication system of claim 11, further comprising the cable assembly, the cable assembly including a trailing sub-assembly having an intermediate connector and an external cable that is terminated to the intermediate connector, the cable assembly including a flexible cable extension that has signal pathways terminated to and extending from the intermediate connector to the mating connector, the intermediate connector communicatively interconnecting the signal pathways of the flexible cable extension and the external cable.

19. The communication system of claim 18, wherein the flexible cable extension permits the signal pathways to bend as the mating connector slides along the non-linear path while transferring an operative force for mating the system connector and the mating connector.

20. The communication system of claim 18, wherein the mating connector is a pluggable input/output (I/O) module.

* * * * *